(No Model.)  3 Sheets—Sheet 2.
C. B. HOBRON.
ANTIFRICTION BEARING.
No. 602,047. Patented Apr. 5, 1898.
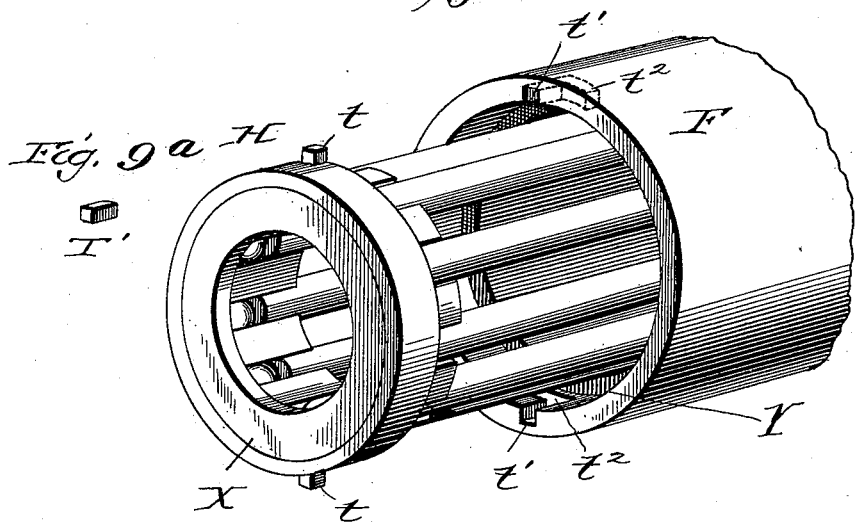
Fig. 9
Fig. 9a
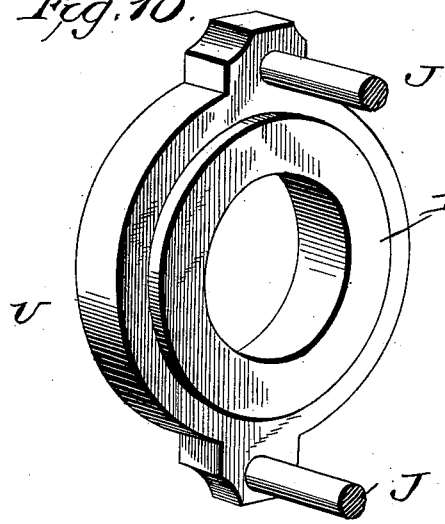
Fig. 10
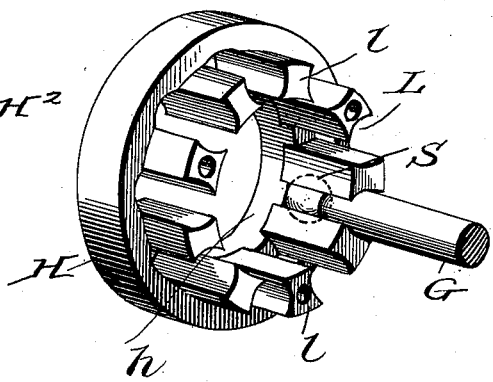
Fig. 11
Witnesses
Inventor
Charles B. Hobron,
By his Attorneys,

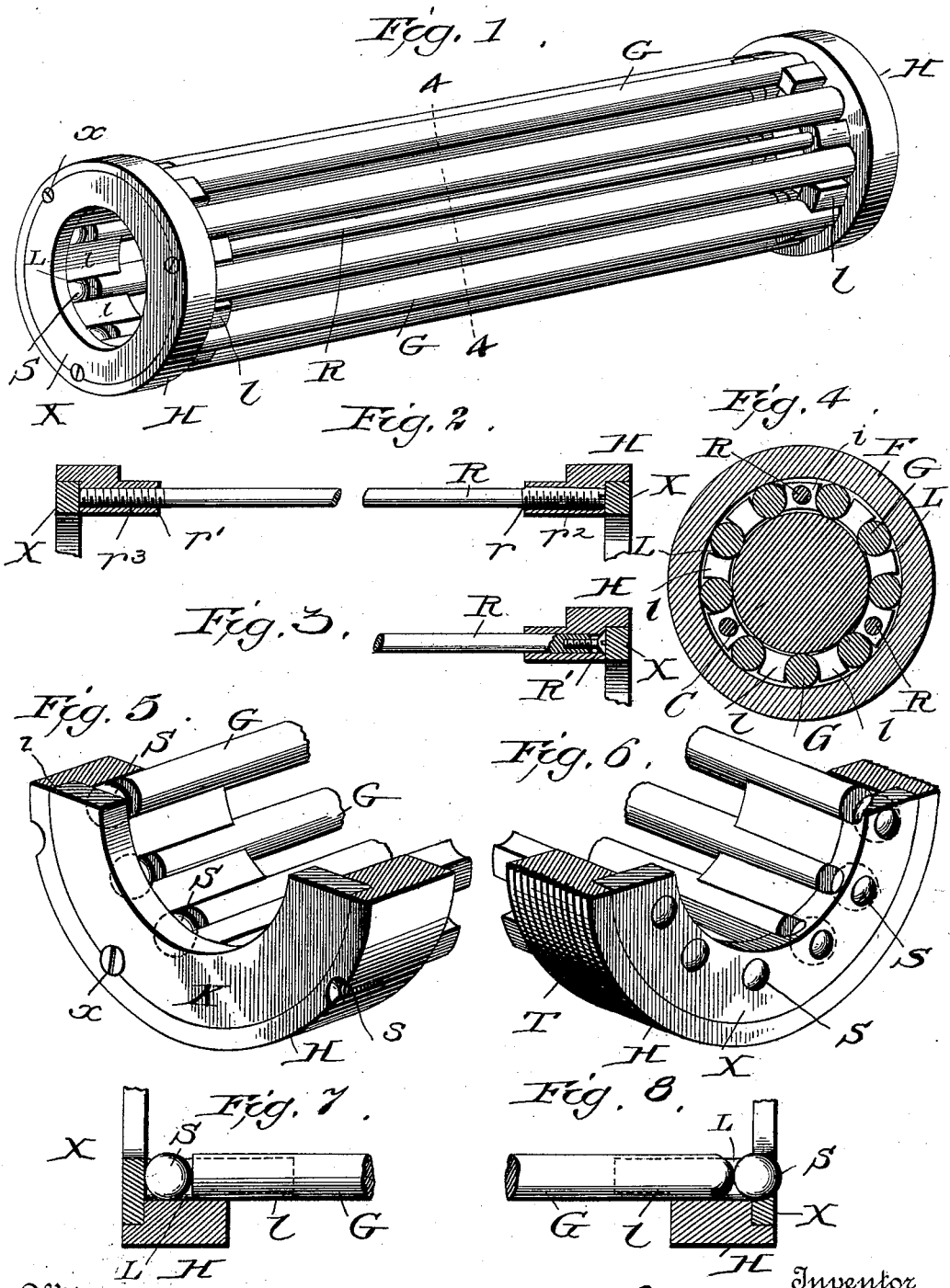

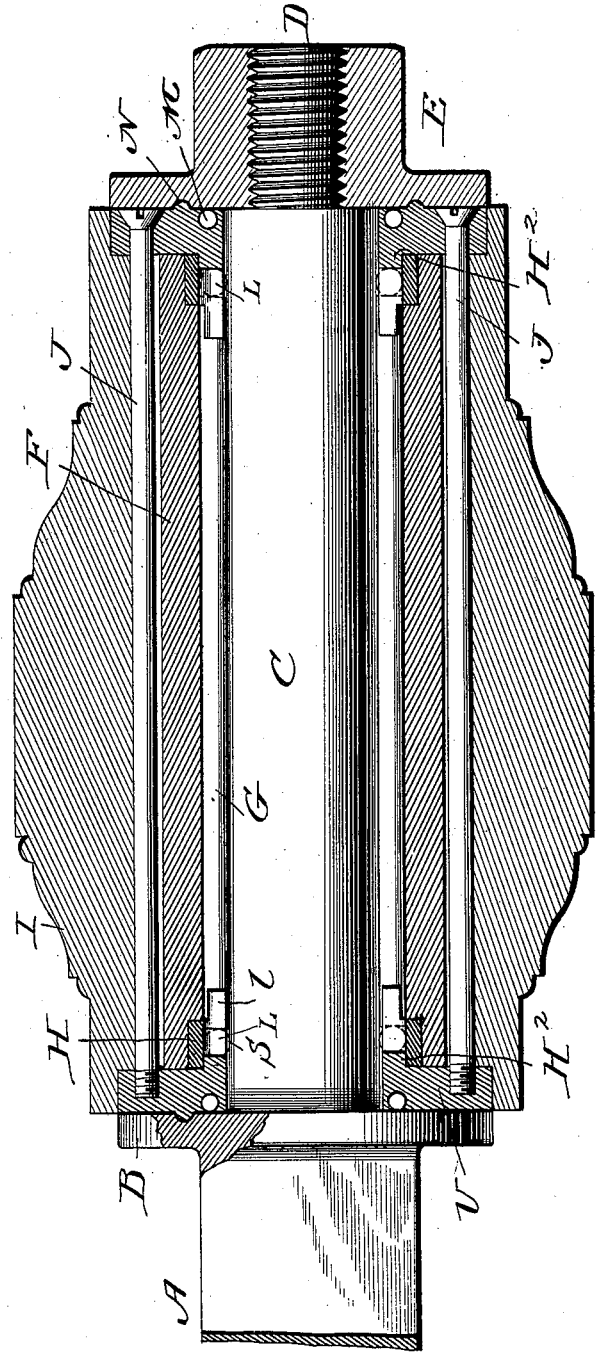

UNITED STATES PATENT OFFICE.

CHARLES B. HOBRON, OF BOERNE, TEXAS, ASSIGNOR OF ONE-HALF TO SAMUEL S. EVELAND, OF PHILADELPHIA, PENNSYLVANIA.

ANTIFRICTION-BEARING.

SPECIFICATION forming part of Letters Patent No. 602,047, dated April 5, 1898.

Application filed April 24, 1897. Serial No. 633,745. (No model.)

*To all whom it may concern:*

Be it known that I, CHARLES B. HOBRON, a citizen of the United States, residing at Boerne, in the county of Kendall and State of Texas, have invented certain new and useful Improvements in Antifriction-Bearings, of which the following is a specification.

According to my present invention I provide an antifriction-bearing in which the rollers are mounted in two roller-supports, each of which has a series of inwardly-projecting lugs formed with roller-sockets between them. The sockets are open to permit the rollers to bear throughout their entire lengths against the shaft or journal and throughout the greater portion of their lengths against a surrounding casing. The arrangement is also such as to permit of the insertion or withdrawal of the rollers endwise. The roller-sockets at one end of the bearing are closed to prevent endwise displacement of the rollers, and a removable ring or similar device is employed to prevent endwise displacement at the opposite end of the bearing. The ring may be readily removed and replaced and permits of the ready removal or insertion of any one of the rollers or all of them without disturbing other parts of the bearing. The roller-sockets, while open to permit the rollers to contact with the shaft or journal, are so formed as to prevent the rollers from dropping out when the shaft or journal is withdrawn. Preferably I place in each roller-socket, at one end or both ends of the bearing, a spherical roller or ball which bears directly against the end of the roller axially and against the ring or other similar device which closes the outer ends of the roller-sockets. In some instances I find it advantageous to cause the balls to extend partially through openings in the rings, for a purpose hereinafter described.

My improved antifriction-bearing may be used wherever there are two parts turning relatively to each other and where it is desirable to reduce wear, friction, and heat.

In the drawings hereto annexed I have shown one way of applying my invention—viz., to a vehicle-axle; but it is obvious that the same invention may be applied to numerous kinds of journals, &c.

In the drawings, Figure 1 shows a perspective view of a set of rollers mounted in one form of my improved roller-supports. Fig. 2 is a detail view of one way of connecting the roller-supports at opposite ends of the rollers. Fig. 3 is a detail view showing another way of accomplishing the same result. Fig. 4 shows a transverse section on the line 4 4 of Fig. 1. This figure also shows a cross-section of a casing surrounding the rollers. Fig. 5 is a detail view in perspective, showing one way of supporting the rollers. Fig. 6 is a similar view showing a modification. Fig. 7 is a detail view showing the manner of arranging balls at the ends of the rollers. Fig. 8 shows a way of arranging balls at the ends of the rollers, so that the balls will also be arranged to take end thrust and wear at the outside of the roller-supports. Fig. 9 is a perspective view showing one way of connecting the roller-supports to the surrounding casing. Figs. 10 and 11 are perspective views showing the manner of connecting one of the roller-supports to an end piece or cap and of connecting this cap to the casing. Fig. 12 shows a longitudinal section through a hub with my improvements applied.

The roller-supports H are similar in construction, and each one is centrally apertured to receive a shaft or journal C, which extends through the supports and is loosely arranged therein. Radially-arranged sockets L are formed in the roller-supports for the ends of the rollers G. These sockets are formed by arranging around the central opening of the roller-supports a series of lugs $l$, which are somewhat triangular in shape, being so formed as to so shape the sockets that the latter shall be widest at their outer and narrowest at their inner ends. The inner faces of the sockets are preferably slightly curved or concaved. The depth of each socket, or the distance from its outer to its inner end radially, is somewhat less than the diameter of the roller, and the width of the socket at its outer end is greater than the diameter of the roller, while it is narrower at its inner end. The ends of the sockets are closed to prevent endwise movement of the rollers, each socket in fact being open on three sides only. By this arrangement the rollers are made to project radially inward, so as to bear upon the journal throughout their entire lengths, and they project radially outward from the sockets, so as to always bear against the sleeve or casing F throughout the greater portion of their lengths. The lugs $l$ will thus be relieved from wear or strain and serve only to position the rollers, hold them in proper alinement, and prevent them from twisting or banking or getting too close together. Any tendency to bank, however, or to come together will not cause much wear on the lugs $l$, as the greatest friction or the greatest tendency to produce friction will be on the journal and on its casing. The rollers, it will be observed, are not reduced at their ends, as is the case in some other bearings, and therefore no sharp corners or edges are presented which would tend to wear the sockets or cut the rollers.

In Fig. 1 the roller-supports are shown as connected together by rods R. These same rods are shown in Figs. 2, 3, and 4. Each rod shown in Fig. 2 is screw-threaded at opposite ends. Its screw-threaded portion $r$ at one end is slightly larger in diameter than the screw-threaded portion $r'$ at the opposite end, so that the rod may be inserted through an opening $r^2$ in one roller-support H and made to enter a socket $r^3$ in the opposite roller-support. The rod may be thus inserted without turning; but when the screw-threaded portion $r'$ reaches the socket $r^3$ the rod may be turned or screwed home and will thus connect the two end pieces, and when fully screwed home, as shown in Fig. 2, the end pieces or roller-supports are prevented from moving either toward or from each other. By this means a nice adjustment may be obtained and the rollers properly supported. Instead of employing the arrangement shown in Fig. 2 the rods may be held in place by means of short screws R', which enter screw-threaded sockets in the ends of the rods, as indicated.

A ring X is employed at one end of the bearing to confine the rollers and prevent endwise movement. Preferably this ring is arranged in an annular recess $z$ on the outer side of the roller-support and is held in place by screws $x$. By removing the screws the ring may be detached and one or more of the rollers removed or inserted. When no balls are used, the ring will contact with the ends of the rollers; but when balls S are used they are interposed between the ends of the rollers and the ring, there being preferably one ball in each roller-socket; but a ball may be used at one end only of each roller. The roller-support at the opposite end of the bearing may be closed in any suitable way, as by a ring X or other similar device. Any desired number of rods may be used—preferably three, as shown, as this number is found to be most efficient. The rollers and their supports, such as shown in Fig. 1, may be arranged in a suitable casing, as indicated in Figs. 1, 4, and 9, and the supports and rollers may turn relatively to the casing, or they may be secured thereto by means of screws passing into sockets $s$, as indicated in Fig. 5. The ends of the rollers may be plain or flat, as shown in Fig. 7, or they may be slightly rounded, as shown in Fig. 8. The balls may be made to pass partially through openings in the ring X, as indicated in Figs. 6 and 8, so as not only to bear against the ends of the rollers, but also to take end thrust from the outside. Instead of securing the roller-supports to the casing F by means of screws entering sockets $s$, as indicated in Fig. 5, the peripheries of the roller-supports may be screw-threaded, as indicated at T in Fig. 6, and this screw-thread may be made to engage with a corresponding screw-thread in the end of the casing. I have shown a removable ring X for confining the balls and rollers; but any other suitable device may be employed for this purpose.

In Fig. 9 I have shown another way of connecting the roller-supports H and the casing F. In this instance the roller-support H is formed with laterally-projecting lugs $t$, which enter bayonet-joint sockets $t'$ in the casing. When the lugs are inserted and turned into the portions $t^2$ of the sockets, a key T' may be inserted in one of the sockets to hold the parts tightly in place.

In Figs. 10 and 11 I have shown still another modification. The roller-support H is similar to that heretofore described, but it is provided on its outer face with a socket $h$, into which fits an annular flange H² on an end cap U. This end cap is connected to a similar end cap by rods J, which are thus held together on the casing. The roller-supports may revolve about the annular flange or ring H², or they may be secured thereto by means of screws or other devices, such as hereinbefore shown and described. Obviously any desired number of rollers and any desired number of balls may be employed.

In Fig. 12 my improvements are shown applied to a vehicle hub and axle. In this instance I have shown the form of bearing illustrated in Figs. 10 and 11. In this figure, A indicates a portion of a vehicle-axle; C, the journal portion thereof; B, a flange or collar at the inner end of the journal, and E a nut secured to the screw-threaded end D of the journal. The roller-supports are provided with antifriction-balls M to take end thrust and with annular ribs N, fitting into corresponding grooves in the flange B and the nut E to exclude dust. I indicates the wooden portion of the hub surrounding the casing F. G indicates the rollers, which are mounted in the manner hereinbefore described in the roller-supports. S indicates the balls. U indicates the cap, (shown also in Fig. 10,) while H indicates the roller-supports, and H² the flange or ring entering a recess in the roller-supports. J indicates bolts or screws for connecting together roller-supports at opposite ends of the bearing.

Antifriction-bearings constructed in accordance with my invention are both durable and efficient. The rollers bear uniformly on the journal or shaft from end to end, and thus distribute friction uniformly. The rollers can conveniently be assembled, and when worn can be readily replaced. The rollers may be inserted radially into their sockets, or they may be inserted endwise therein. The ring X can be readily removed and replaced for the purpose of inserting or withdrawing the rollers. As shown in Fig. 9, the roller-supports enter annular sockets Y in the casing and may either turn therein or be held firmly in place by any of the devices shown or their equivalents.

I claim—

1. An antifriction-bearing comprising a series of rollers, roller-supports at opposite ends only thereof and having inwardly-projecting lugs formed with roller-sockets between them, a ring removably secured to one of the roller-supports and closing the ends of the roller-sockets to prevent endwise displacement of the rollers, means for closing the sockets in the other roller-support, a shaft or journal against which the rollers bear throughout their entire lengths and a casing against which the rollers bear throughout the greater portion of their lengths.

2. The combination of the rollers, the roller-supports having individual sockets for the rollers, and balls arranged in said individual roller-sockets at the ends of the rollers.

3. The combination of the rollers, roller-supports formed with a series of roller-sockets, devices for closing the ends of the sockets, and balls extending partially through the openings in said closing devices and bearing against the ends of the rollers.

4. An antifriction-bearing comprising a series of rollers, roller-supports at opposite ends thereof having inwardly-projecting lugs formed with roller-sockets between them, a ring removably secured to one of the roller-supports, and detachably connected with it, means for closing the sockets in the other roller-support, balls arranged individually in the roller-sockets and interposed between the ends of the rollers and the ring, a shaft or journal against which the rollers bear throughout their entire lengths, and a casing against which the rollers bear throughout the greater portion of their lengths.

5. An antifriction-bearing comprising a series of rollers, roller-supports at opposite ends only thereof and having inwardly-projecting lugs formed with roller-sockets between them which are open at their inner and outer ends to permit the rollers to bear against the journal and also against the case, and are open at opposite ends to permit endwise movement of the rollers, a ring removably secured to one of the roller-supports and closing the ends of the roller-sockets to prevent endwise displacement of the rollers, means for closing the sockets in the other roller-support, a shaft or journal against which the rollers bear throughout their entire lengths, and a casing against which the rollers bear throughout the greater portion of their lengths.

In testimony whereof I have hereunto subscribed my name.

CHARLES B. HOBRON.

Witnesses:
S. S. EVELAND,
DANL. F. MCCONNELL.